May 26, 1964 J. J. WILTING 3,134,948

TRANSISTOR VOLTAGE CONVERTER

Filed Oct. 18, 1960

INVENTOR

JOHANNES J. WILTING

BY Frank R. Jifari

AGENT 3,134,948

TRANSISTOR VOLTAGE CONVERTER

Johannes Jacobus Wilting, Eindhoven, Netherlands, assignor to North American Philips Company, Inc., New York, N.Y., a corporation of Delaware Filed Oct. 18, 1960, Ser. No. 63,430
Claims priority, application Netherlands Nov. 12, 1959
6 Claims. (Cl. 331—113)

Figure 1:
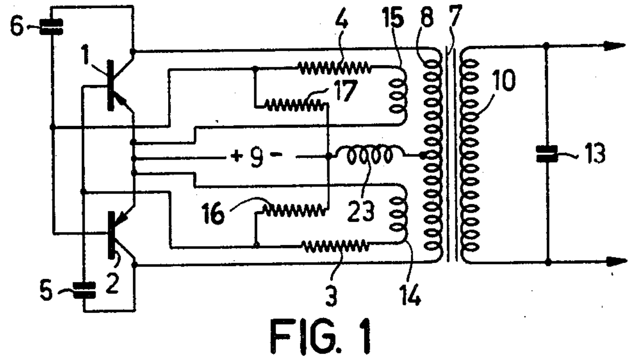

This invention relates to a self-oscillating circuit arrangement for converting a low direct voltage into a higher alternating voltage, comprising two push-pull connected junction transistors with a winding connected between the collector electrodes of the transistors, the winding having a center tap connected to one terminal of the source of low direct voltage; in the circuit arrangement a resonant circuit is constituted by a capacitance in combination with the inductance effective in the collector circuits of the transistors. The resonance frequency of the resonant circuit mainly determines the operating frequency of the arrangement at a value of at least the same order of magnitude as the $\alpha'$ limit frequency of the transistors.

This type of arrangement has been described in U.S. patent application Serial No. 829,273, now Patent No. 3,008,068, in which the base-emitter circuit of each of the transistors includes an RC-member; the capacitive reactance of this RC-member, at the operating frequency of the arrangement, is lower than the value of the resistance thereof.

This device of the prior application ensures a satisfactory operation at comparatively high frequencies with the use of the RC-member, the base current peak of each of the transistors leading with respect to the collector current thereof; additionally, due to the free charge carriers stored in the base zone of the transistor, this collector current is maintained even after the blocking of the base-emitter path of the transistor and is interrupted prior to the reversal of the collector voltage thereof by a reverse current pulse fed to its base via the capacitance of the RC-member.

With this and with similar circuit arrangements of the kind set forth, difficulties arise from the spread of the switching-on and/or fall-times and of the differences in current amplification factor $\alpha'$ of different transistors of given type. Because of these difficulties, the transistors must be selected with comparatively small tolerances and/or each component of the arrangement has to be adjusted individually, taking into account the characteristic values of the particular transistors used. In addition, further difficulties are usually met with when replacing one or both transistors.

In the above-noted patent, certain measures were indicated to be taken for avoiding or at least mitigating these difficulties. In spite of these measures, the arrangements of the kind set forth remain critical with respect to the collector-base current amplification factor $\alpha'$. If this value is low, for example, lower than 40, the base injection may, under certain conditions, occur too soon; as a consequence, the transistor is "emptied" by the capacitative load, i.e., charge carriers are removed, switching off may take place too early, and the resonant circuit receives an inadequate quantity of energy. Thus, the arrangement no longer operates satisfactorily.

The primary object of the invention is to provide a converter circuit arrangement of the above general type which is not critical with respect to the characteristic magnitudes of the transistors and particularly with respect to their collector-base current amplification factors $\alpha'$, so that any transistor of a given type may be used in this arrangement or be replaced therein by any other transistor without readjustment of any of the components.

According to one aspect of the invention, the collector-emitter circuit of each transistor includes a small inductor in series with the resonant circuit; the latter is thus prevented from being practically short-circuited by its capacitance when the associated transistor becomes conductive. In addition, the time of occurrence of the switching-on pulse fed to the base electrode of the transistor is prolonged.

When a transistor included in a circuit according to the invention becames conductive, its initial load is inductive due to the provision of the small inductor which may have a value of, for example 30 $\mu$h., so that its collector current increases less rapidly. Also the base current pulse is less sharp due to the positive voltage pulse produced across the small inductor, which has a double counter-acting action (i.e. also by way of the reduction of the transformer feedback voltage brought about by its inclusion). Both the leading and trailing edges are on the average less steep and the pulse lasts slightly longer: it is prolonged or stretched by the small inductor.

Figure 2:
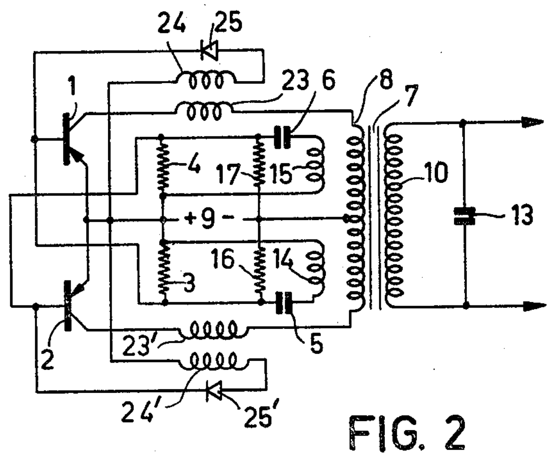
Figure 3:
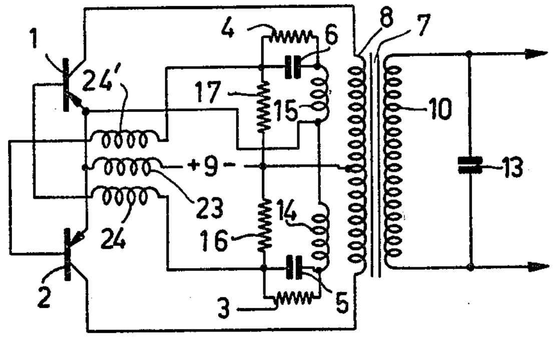

The invention will be described more fully with reference to the drawing, in which FIGS. 1, 2 and 3 are circuit diagrams of three different embodiments of the circuit arrangement according to the invention.

FIG. 1 shows the diagram of a circuit arrangement for converting a low direct voltage from a supply source 9 into a high alternating voltage. The arrangement comprises two push-pull connected junction transistors 1 and 2 and a winding 8, the latter being connected between the collector electrodes of the said transistors and having a center tap connected to the negative terminal of the source of low direct voltage. A resonant circuit is constituted by the combination of capacitor 13 and the inductance effect in the collector circuits of the transistors; this inductance includes inter alia the inductance of the transformer with air gap comprising the winding 8 and a secondary winding 10, across which the capacitor 13 is connected. The resonance frequency of this resonant circuit mainly determines the operating frequency of the self-oscillating arrangement at a value of at least the same order of magnitude as the limit frequency of the collector-base current amplification factor $\alpha'$ of the transistors.

As shown, the base electrode of each of the transistors 1 and 2 is on the one hand inductively coupled to the collector electrode of the other transistor via a resistor 3 or 4 respectively and a feedback winding 14 or 15 respectively of the transformer 7 and is further connected, for direct currents, to the positive terminal of the supply source 9. The base electrode of each of the transistors 1 and 2 is also connected to the collector electrode of the other transistor via a capacitor 5 or 6 respectively and also to the negative terminal of the supply source 9 via a starting resistor 16 or 17 respectively. Thus far, the arrangement described is identical to one of the arrangements described in the above-noted Patent No. 3,008,068.

In accordance with the present invention, however, a small inductor 23 having an inductance, for example, of about 30 $\mu$h. is included in the collector-emitter path of each of the transistors 1 and 2. In the embodiment shown in FIG. 1, this small inductor is common to the emitter-collector circuits of the two transistors and is connected between the negative terminal of the supply source 9 and the center tap of the winding 8.

As explained in Patent No. 3,008,068, the feedback losses are reduced due to the fact that the discharge resistor 4 or 3 of the feedback capacitor 6 or 5 respectively is not connected directly between the base of the associated transistor and the emiter thereof, but via an auxiliary winding 15 or 14 respectively of the transformer 7. The part of the energy loss across the resistor 3 or 4 which the transformer has additionally to supply is thus reduced. If the resistor 3 or 4 had been connected directly across the corresponding capacitor, the feedback loss would in principle have been minimum but the switching-off of the transistor or the blocking thereof would take place less abruptly due to the rapid discharge of the capacitor 5 or 6. The transistor losses would thus again be higher. The auxiliary windings 14 and 15 may, for example, have each one-third to one-half of the number of turns of the corresponding collector winding (half of the winding 8).

Due to the inclusion of the small inductor 23, the initial load of each of the transistors 1 and 2 is inductive at the instant when the associated transistor becomes conductive. The collector current therefore increases less rapidly than if the inductance were not present. When the transistor becomes conductive, a positive voltage pulse is produced across the small inductor 23. This pulse has a double counter-acting effect on the negative feedback voltage, the transformer voltage being indeed initially also reduced. The forward base current pulse which renders the transistor conductive is therefore less sharp. Its leading and trailing edges are, on the average, less steep, so that the pulse has a longer duration. In other words, the forward base current pulse is lengthened.

The resonant circuit consisting of the inductance effective between the collector electrodes of the transistors 1 and 2 and of the capacitor 13 effective between the said electrodes via the transformer 7, is decoupled to a small extent from the source of direct voltage 9 by the small inductor 23. When either of the transistors 1 and 2 is conductive, the secondary capacitor voltage therefore increases slightly. In other words, the energy in the resonant circuit can be slightly increased by means of the small inductor 23. This effect may be rendered more pronounced by choosing a higher value for the small inductor 23 and also by using an inductive or partly inductive (combined) feedback obtained therefrom.

The second embodiment shown in FIG. 2 differs from the first embodiment mainly in that a small inductor 23 and 23' is included in the collector-emitter circuit of each of the transistors 1 and 2 respectively, i.e. between the colector of each transistor and the corresponding end of the winding 8. An auxiliary winding 24 and 24' respectively is coupled with each of the small inductors 23 and 23', so that when the associated transistor is blocked, the voltage pulse then produced across the small inductor 23 or 23' is fed back in the reverse direction to the base electrode of this transistor via a rectifier 25 or 25' respectively. This fedback reverse voltage pulse accelerates switching-off of each of the transistors 1 and 2, while the rectifiers 25 and 25' prevent a feedback of negative voltage pulses from the small inductor 23 or 23' respectively to the base of the associated transistor. Consequently, each of the transistors is switched off very rapidly and the feedback voltage may, if desired, be chosen lower, due also to the effect of the small inductor 23 and 23', so that the efficiency increases. The gain in efficiency of the arrangement shown in FIG. 2 as compared with the efficiency of the arrangement shown in FIG. 1, however without the small inductor 23, is at least of the order of 5%.

It should be noted that the feedback circuit of the arrangement shown in FIG. 2 differs slightly from that of the arrangement of FIG. 1 in that the transistors are fed back only by means of the windings 14 and 15. The capacitors 5 and 6 are thus connected between the common points of the resistors 3 and 16 and 4 and 17 respectively and the free ends of the windings 14 and 15 respectively, instead of being directly connected between the base of one transistor and the collector of the other transistor. The resistor 3 is connected in parallel with the series combination of the capacitor 5 and of the winding 14 instead of being connected in series with the winding 14 and the resistor 4 is connected in a similar manner, directly between the base of the transistor 2 and the emitter thereof.

The third embodiment shown in FIG. 3 includes only one small inductor 23, which is connected between the emitter electrodes of the two transistors 1 and 2 and the positive terminal of the supply source 9. Two auxiliary windings 24 and 24' are coupled with this small inductor and included in series in the base circuit of the corresponding transistor 1 or 2 respectively. A further difference with respect to the arrangement of FIG. 2 consists in that the resistors 3 and 4 are connected directly in parallel with the coresponding capacitors 5 and 6 respectively and the auxiliary windings 24 and 24' are connected between the base electrodes of the corresponding transistors 1 and 2 respectively and the parallel combinations of the resistors 3 and 4 respectively and of the capacitors 5 and 6 respectively. Due to this method of feeding back the voltage peaks across the small inductor 23 by means of auxiliary windings connected in series in the feedback circuits of the transistors 1 and 2, the rectifiers 25 and 25' of the arrangement shown in FIG. 2 are no longer required. As in the embodiments of FIGS. 1 and 2, the windings 14 and 15 may be formed by the two halves of a single winding provided with a center tap.

As stated above, the parallel connection of the feedback capacitors 5 and 6 with their respective discharge resistors 3 and 4 ensures a minimum of feedback losses. In the arrangement shown in FIG. 3, this parallel connection is again rendered favorable by the fact that the reverse pulses fed back to the base electrodes of the transistors 1 and 2 via the auxiliary windings 24 and 24' respectively strongly accelerate the switching-off of the transistors, so that the detrimental effect of the rapid discharge of the capacitors 5 and 6 respectively via the parallel-connected resistors 3 and 4 respectively with respect to the desired abrupt switching-off of the transistors 1 and 2 respectively is compensated.

When either of the transistors 1 and 2 is blocked, the reverse voltage pulse fed back by means of the auxiliary windings 24 and 24' respectively is practically undamped, since the base-emitter path of the transistor soon becomes blocked. Conversely, when either of the transistors 1 and 2 becomes conductive, the forward voltage pulses produced across the small inductor 23 is very strongly damped by the series combination of the feedback circuit comprising the auxiliary windings 24 and 24' and the base-emitter path of the associated transistor. The reverse voltage pulses supplied to the base of each transistor 1 or 2 by means of the auxiliary winding 24 or 24' are therefore very sharp, very short and have a large amplitude, whereas the forward pulse fed to the same base from the small inductor 23 and by means of the auxiliary winding 24 or 24' has a small amplitude, is unsharp and comparatively long, just as desired.

In the embodiments described above, the base-emitter path of each of the transistors includes an RC-member. A small inductor in the collector-emitter circuit of each transistor of a self-oscillating circuit of the kind set forth may be employed in any case in which it is desirable to render inductive the initial load of each transistor at the instant when it becomes conductive and in which the prolongation of the switching-on pulse fed to the base electrode of each transistor brought about by the small inductance does not adversely affect the operation of the self-oscillating arrangement.

While the invention has been described with respect to specific embodiments, many modifications and variations thereof will be readily apparent to those skilled in the art without departing from the inventive concept and its applications, the scope of which is set forth in the appended claims.

What is claimed is:

1. A self-oscillating circuit arrangement for converting a low direct voltage into a higher alternating voltage, comprising two push-pull connected junction transistors each having base-, emitter- and collector-electrodes, a winding connected between the collector electrodes of said transistors, said winding having a center tap connected to one terminal of a source of low direct voltage, the other terminal of said source being connected to the emitter-electrodes of said transistors, a capacitor coupled with said winding, said capacitor constituting a resonant circuit in combination with the inductance of said winding effective in the collector circuits of the transistors, the resonance frequency of said resonant circuit principally determining the operating frequency of the arrangement, and regenerative feedback means intercoupling the base electrode of each transistor and the collector-electrode of the other transistor, the collector-emitter circuit of each transistor including an inductor connected in series therein, said inductor preventing a short-circuit of the collector-emitter circuit by the said capacitor when an associated transistor becomes conductive and also prolonging the effect of said regenerative feedback means during the conducting period of each of said transistors.

2. A self-oscillating circuit arrangement for converting a low direct voltage into a higher alternating voltage, comprising two push-pull connected junction transistors each having base-, emitter- and collector-electrodes, a winding connected between the collector electrodes of said transistors, said winding having a center tap connected to one terminal of a source of low direct voltage, the other terminal of said source being connected to the emitter-electrodes of said transistors, a capacitor coupled with said winding, said capacitor constituting a resonant circuit in combination with the inductance of said winding effective in the collector circuits of the transistors, the resonance frequency of said resonant circuit principally determining the operating frequency of the arrangement, and regenerative feedback means intercoupling the base electrode of each of said transistors and the collector-electrode of the other transistor, the collector-emitter circuits of both transistors including an inductor connected in series in a common circuit including said source of direct voltage and extending from said center tap to the emitter-electrodes of the two transistors, said inductor preventing a short-circuit of the collector-emitter circuit by the said capacitor when an associated transistor becomes conductive, said inductor also prolonging the effect of said regenerative feedback means during the conducting period of each of said transistors.

3. A circuit arrangement as claimed in claim 1, including further feedback means coupled to said inductor and connected to the base electrodes of said transistors, said further feedback means feeding back to the base of a particular transistor a reverse voltage pulse produced across said inductor when said particular transistor becomes non-conductive, thereby accelerating the switching-off of said particular transistor.

4. A circuit arrangement as claimed in claim 3, said further feedback means including two windings coupled to said inductor, each winding being connected to the base electrode of one of the transistors.

5. A self-oscillating circuit arrangement for converting a low direct voltage into a higher voltage, comprising two push-pull connected junction transistors each having base-, emitter- and collector-electrodes, a winding connected between the collector electrodes of said transistors, said winding having a center tap connected to one terminal of a source of low direct voltage, the other terminal of said source being connected to the emitter-electrodes of said transistors, a capacitor coupled with said winding, said capacitor constituting a resonant circuit in combination with the inductance of said winding effective in the collector circuits of the transistors, the resonance frequency of said resonant circuit principally determining the operating frequency of the arrangement, and regenerative feedback means intercoupling the base electrode of each of said transistors and the collector-electrode of the other transistor, two inductors, each inductor being connected between the collector of one transistor and said winding, further feedback means coupled to said inductors and connected to the base-electrodes of the transistors to feed back to the base-electrode of a particular transistor a voltage pulse produced across the associated inductor when said particular transistor becomes non-conductive, said further feedback means including two further windings, each being coupled to an associated inductor and each being connected to the base-electrode of an associated transistor through a rectifier having a polarity such that only reverse pulses can be fed back to the base-electode of the associated transistor, each of said inductors preventing a short-circuit of the collector-emitter circuit of the associated transistor by the said capacitor when the associated transistor becomes conductive and also prolonging the effect of said regenerative feedback means during the conducting period of the associated transistor.

6. A circuit arrangement as claimed in claim 5, wherein the base-emitter circuit of each transistor includes an RC-member whose capacity has an impedance at the operating frequency of the circuit which is smaller than the resistance value of said member, each of said windings of said further coupling means being connected between the base-electrode of the associated transistor and the RC-member included in the base-emitter circuit thereof.

References Cited in the file of this patent

UNITED STATES PATENTS

| | | |
|---|---|---|
| 1,835,156 | Hazeltine | Dec. 8, 1931 |
| 2,848,614 | Lyons | Aug. 19, 1958 |
| 2,962,667 | Relation et al. | Nov. 29, 1960 |
| 2,965,856 | Roesel | Dec. 20, 1960 |
| 2,971,166 | Schultz | Feb. 7, 1961 |